US012100536B2

(12) United States Patent
Imai et al.

(10) Patent No.: US 12,100,536 B2
(45) Date of Patent: Sep. 24, 2024

(54) TRANSIENT VOLTAGE PROTECTION DEVICE

(71) Applicant: TDK CORPORATION, Tokyo (JP)

(72) Inventors: Yusuke Imai, Tokyo (JP); Masato Hayatsu, Tokyo (JP); Naoyoshi Yoshida, Tokyo (JP); Takeshi Yanata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 23 days.

(21) Appl. No.: 17/829,569

(22) Filed: Jun. 1, 2022

(65) Prior Publication Data

US 2022/0392701 A1 Dec. 8, 2022

(30) Foreign Application Priority Data

Jun. 3, 2021 (JP) ................................ 2021-093742

(51) Int. Cl.

| | |
|---|---|
| ***H01C 1/142*** | (2006.01) |
| ***H01C 1/148*** | (2006.01) |
| ***H01C 7/10*** | (2006.01) |
| ***H01C 7/12*** | (2006.01) |

(52) U.S. Cl.

CPC ........... *H01C 1/142* (2013.01); *H01C 7/1006* (2013.01); *H01C 7/123* (2013.01); *H01C 1/148* (2013.01)

(58) Field of Classification Search

CPC ...... H01C 1/142; H01C 1/148; H01C 7/1006; H01C 7/123

See application file for complete search history.

(56) References Cited

U.S. PATENT DOCUMENTS

| | | | | |
|---|---|---|---|---|
| 8,238,069 | B2 * | 8/2012 | Adachi ..................... | H01T 4/12 361/56 |
| 8,421,582 | B2 * | 4/2013 | Hiehata ................... | H01L 23/60 338/21 |
| 8,760,830 | B2 * | 6/2014 | Ikeda ....................... | H02H 3/20 361/56 |
| 9,516,728 | B2 * | 12/2016 | Tsukizawa ................ | H05F 3/04 |
| 9,795,020 | B2 * | 10/2017 | Shibayama .......... | H05K 9/0067 |
| 2010/0309595 | A1 | 12/2010 | Adachi et al. | |
| 2013/0077199 | A1 | 3/2013 | Ikeda | |

FOREIGN PATENT DOCUMENTS

| | | | |
|---|---|---|---|
| CN | 102893467 | A | 1/2013 |
| JP | 2017-073257 | A | 4/2017 |
| WO | 2009/098944 | A1 | 8/2009 |

* cited by examiner

*Primary Examiner* — Kyung S Lee
(74) *Attorney, Agent, or Firm* — Oliff PLC

(57) ABSTRACT

A transient voltage protection device includes: an element body; a cavity portion provided in the element body; a pair of internal electrodes disposed in the element body; and a pair of external electrodes connected to the pair of internal electrodes. The pair of internal electrodes extend along a first direction and face each other in a second direction intersecting the first direction. The cavity portion includes a gap region located between the pair of internal electrodes in the second direction. A tip portion of at least one of the pair of internal electrodes is in contact with only the element body.

15 Claims, 7 Drawing Sheets

TRANSIENT VOLTAGE PROTECTION DEVICE

TECHNICAL FIELD

The present disclosure relates to a transient voltage protection device.

The present application is based upon and claims the benefit of the priority from Japanese patent application No. 2021-093742, filed on Jun. 3, 2021, which is hereby incorporated by reference in its entirety.

BACKGROUND

International Publication No. 2009/098944 discloses an ESD (Electro Static Discharge) protection device including a ceramic multilayer substrate, a cavity portion provided in the ceramic multilayer substrate, a pair of discharge electrodes disposed to face each other in the cavity portion, and a pair of external electrodes connected to the pair of discharge electrodes. In the ESD protection device, since discharge is likely to occur due to the cavity portion, high ESD resistance can be realized.

SUMMARY

In the ESD protection device described in international Publication No. 2009/098944, since an electric field is concentrated on the tip portion of the discharge electrode, the tip portion of the discharge electrode is likely to deteriorate. Therefore, the life of the ESD protection device cannot be extended.

An aspect of the present disclosure provides a transient voltage protection device capable of achieving high ESD resistance and long life.

A transient voltage protection device according to the aspect of the present disclosure includes: an element body; a cavity portion provided in the element body; a pair of internal electrodes disposed in the element body; and a pair of external electrodes connected to the pair of internal electrodes. The pair of internal electrodes extend along a first direction and face each other in a second direction intersecting the first direction. The cavity portion includes a gap region located between the pair of internal electrodes in the second direction. A tip portion of at least one of the pair of internal electrodes is in contact with only the element body.

In the transient voltage protection device, the gap region of the cavity portion is located between the pair of internal electrodes facing each other. Therefore, discharge can be easily generated between the pair of internal electrodes. A tip portion of at least one of the pair of internal electrodes is in contact with only the element body. Therefore, discharge at the tip portion of at least one of the pair of internal electrodes is suppressed, and as a result, deterioration of the tip portion is suppressed. Therefore, high ESD resistance and long life can be achieved.

A tip portion of each of the pair of internal electrodes may be in contact with only the element body. In this case, long life can be further achieved.

A at least one of the pair of internal electrodes may include a portion facing a region other than the gap region in the cavity portion. In this case, since discharge can be more easily generated between the pair of internal electrodes, high ESD resistance can be further achieved.

The transient voltage protection device may further include a discharge auxiliary portion disposed in the element body. The discharge auxiliary portion may be in contact with the pair of internal electrodes and connects the pair of internal electrodes to each other. In this case, a discharge can be reliably generated between the pair of internal electrodes. Therefore, high ESD resistance can be reliably achieved.

The discharge auxiliary portion may face the gap region. In this case, since the discharge auxiliary portion includes a portion facing the gap region, discharge can be more reliably generated between the pair of internal electrodes. Therefore, high ESD resistance can be more reliably achieved.

Each of the pair of internal electrodes may include: a side edge facing the gap region; and a first surface adjacent to the side edge and being in contact with the discharge auxiliary portion. In this case, since the side edge facing the gap region and the first surface in contact with the discharge auxiliary portion are adjacent to each other in the internal electrode, discharge can be more reliably generated between the pair of internal electrodes. Therefore, high ESD resistance can be more reliably achieved.

Each of the pair of internal electrodes may further include a second surface that is adjacent to the side edge and faces away from the first surface. The second surface may face the cavity portion. In this case, since discharge can be more easily generated between the pair of internal electrodes, high ESD resistance can be more reliably achieved.

The pair of external electrodes may be disposed on the element body so as to face each other in the first direction. In this case, since the pair of external electrodes can be disposed at both ends of the element body in the first direction, it is possible to suppress the occurrence of a short circuit between the pair of external electrodes.

DETAILED DESCRIPTION

Figure 1:
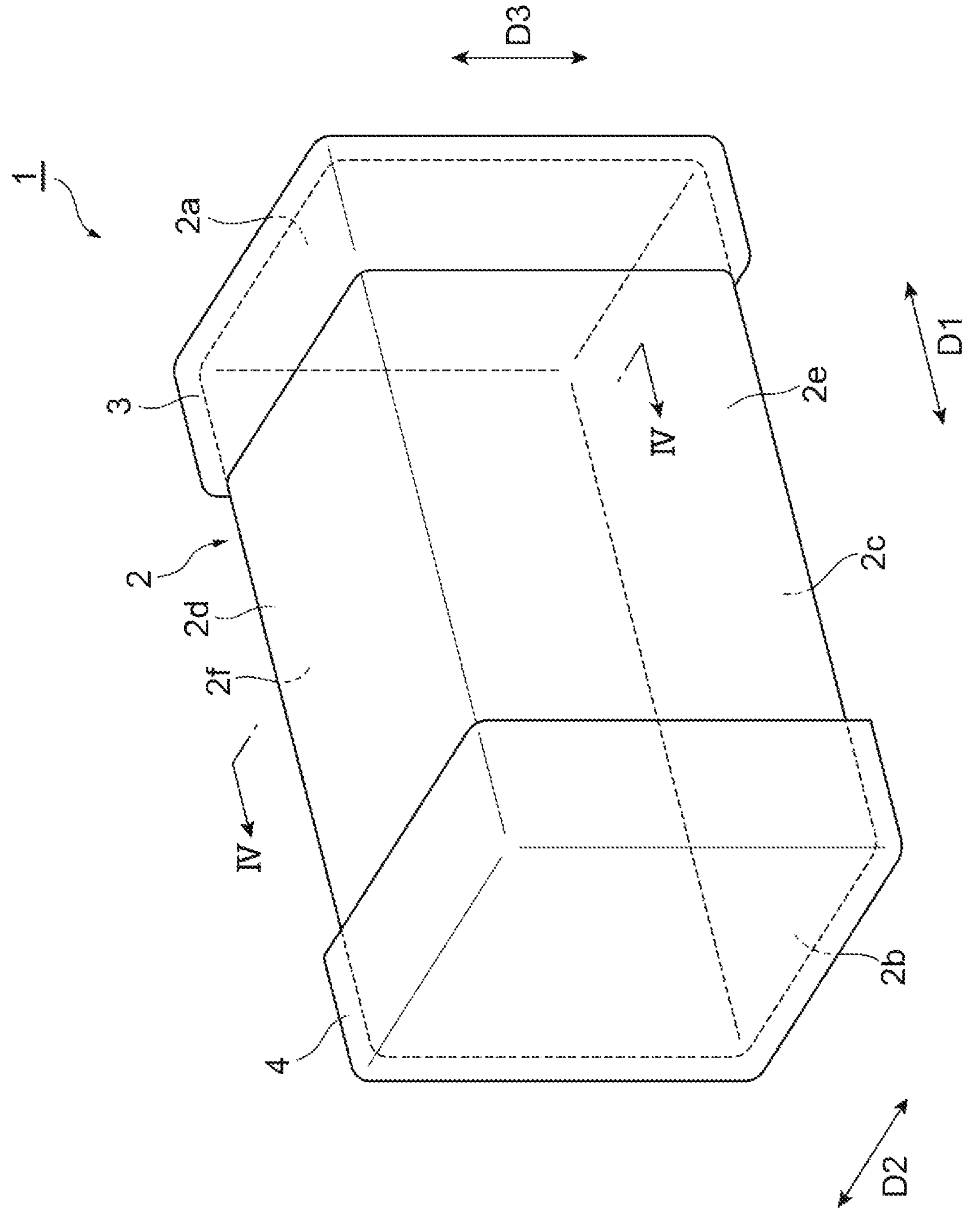
FIG. 1 is a perspective view showing a transient voltage protection device according to an embodiment.
Figure 2:
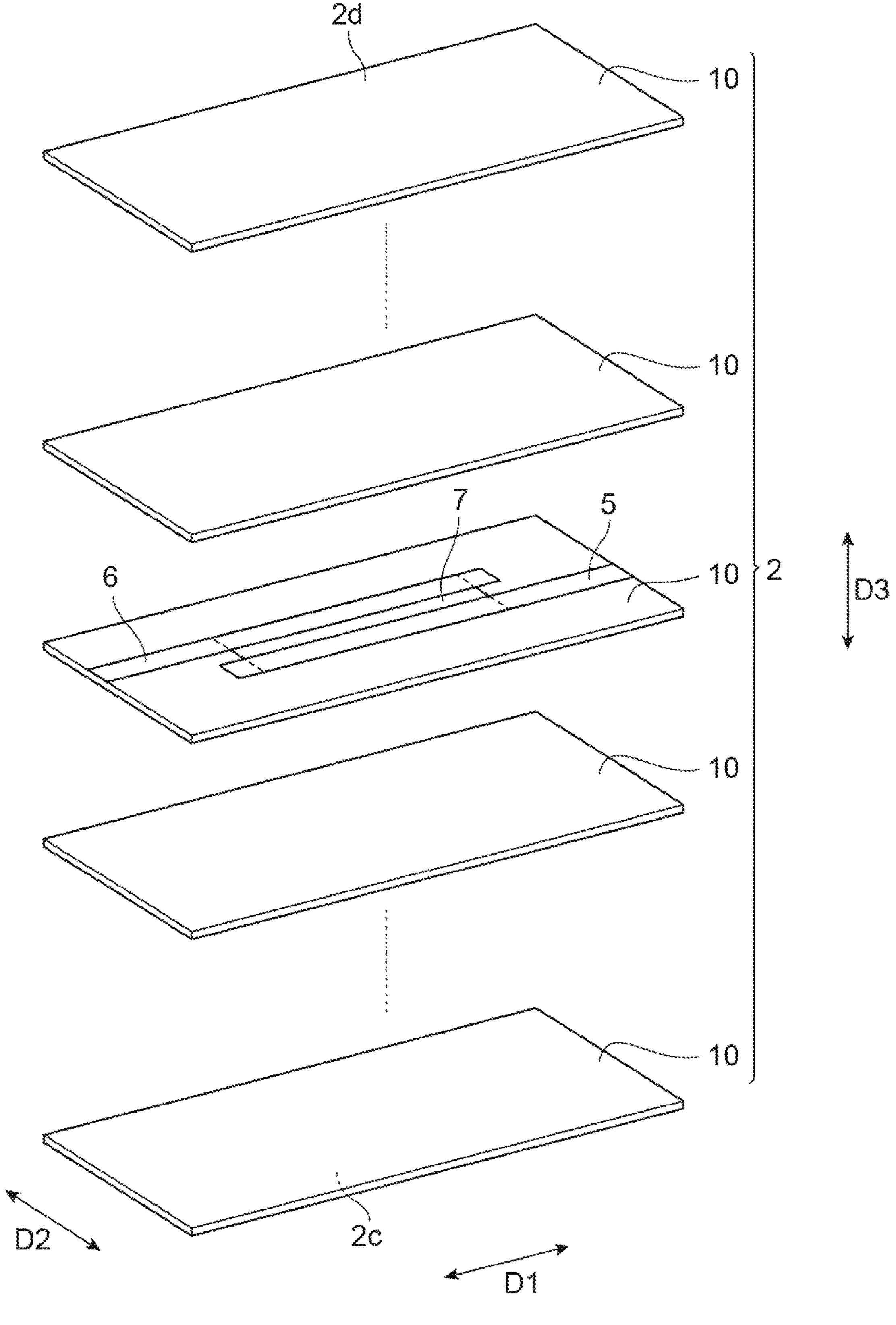
FIG. 2 is an exploded perspective view of the transient voltage protection device of FIG. 1.
Figure 3:
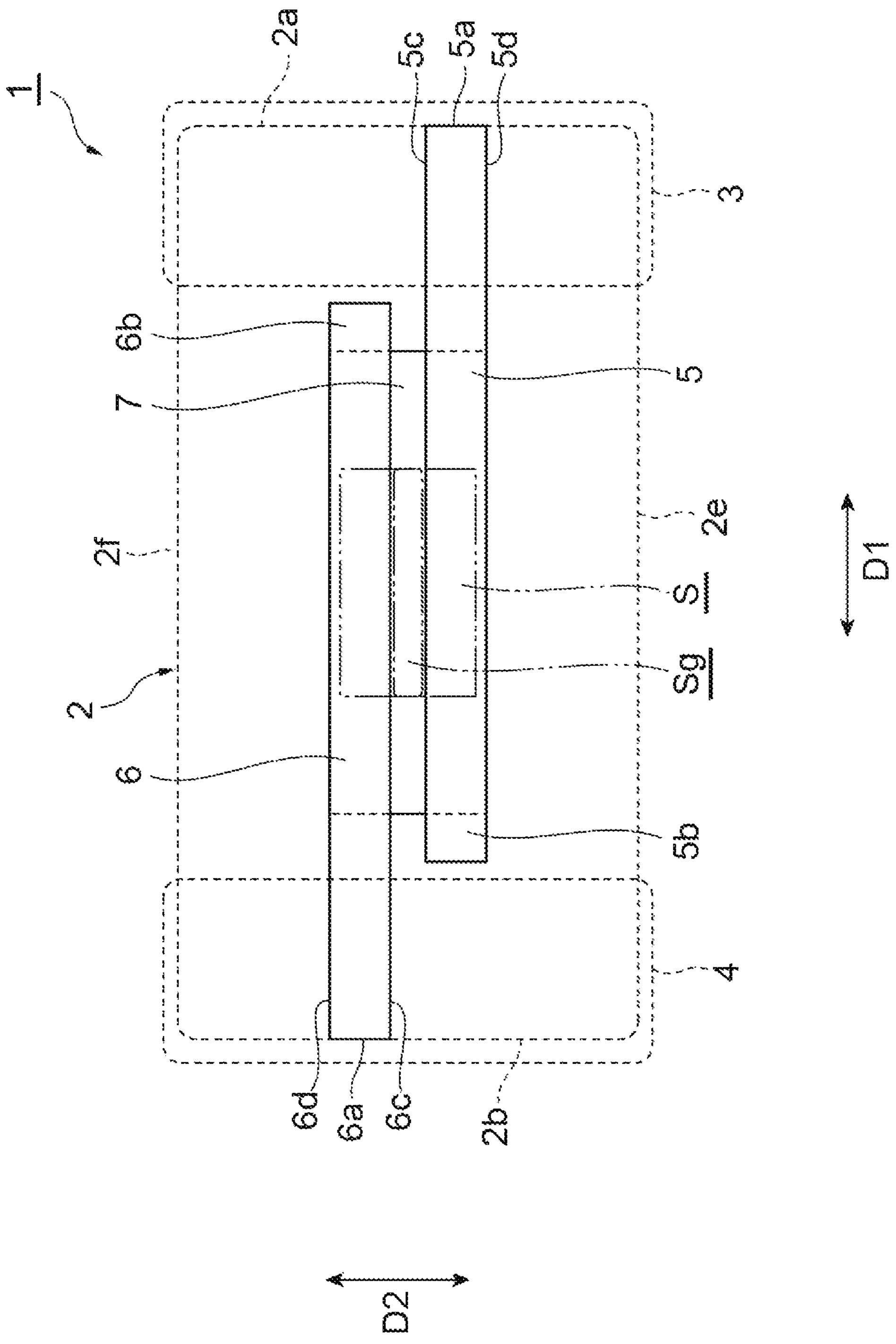
FIG. 3 is a perspective view of the transient voltage protection device of FIG. 1 as viewed from the laminating direction.
Figure 4:
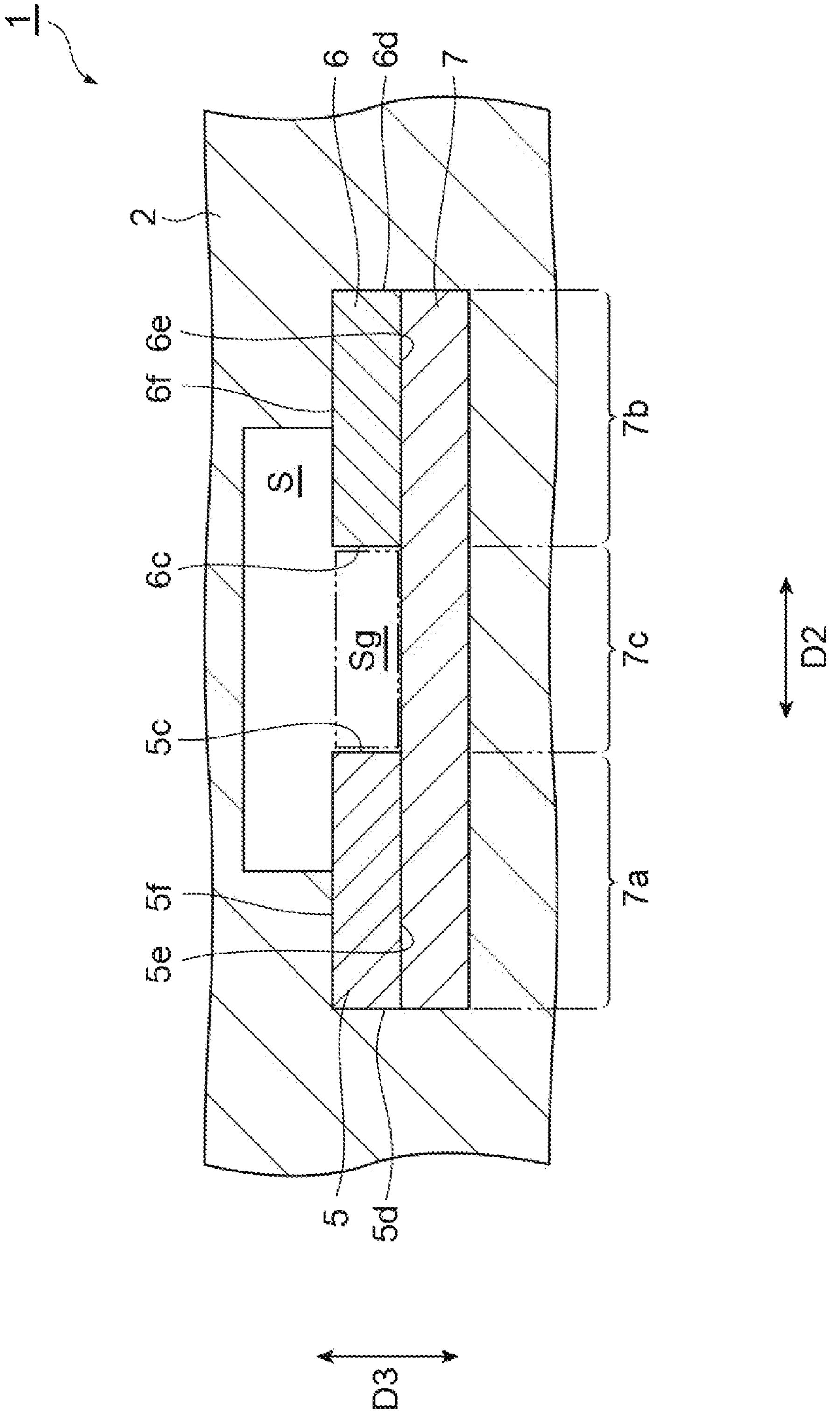
FIG. 4 is a cross-sectional view taken along line IV-IV of FIG. 1.

Hereinafter, an embodiment of the invention will be described in detail with reference to the accompanying drawings. In the description, the same reference symbols are used for the same elements or elements having the same function, and duplicate explanations will be omitted.

A transient voltage protection device 1 according to the present embodiment shown in FIGS. 1 to 4 is an electronic component that is mounted on an electronic apparatus (not illustrated) and protects the electronic apparatus from a transient voltage such as ESD. The electronic device to be protected is, for example, a circuit board or an electronic component. The transient voltage protection device 1 includes an element body 2, a pair of external electrodes 3 and 4, a pair of internal electrodes 5 and 6, a discharge auxiliary portion 7, and a cavity portion S. The internal electrodes 5 and 6 are discharge electrodes configured to discharge. The internal electrodes 5 and 6 constitute a transient voltage suppressor together with the discharge auxiliary portion 7 and the cavity portion S. The transient voltage suppressor has a transient voltage absorbing capability.

The element body 2 has a rectangular parallelepiped shape. The rectangular parallelepiped shape includes, for example, a rectangular parallelepiped shape in which corner portions and ridge portions are chamfered, and a rectangular parallelepiped shape in which corners and ridges are rounded. The element body 2 includes, as outer surfaces, a pair of end surfaces 2*a* and 2*b* facing away from each other, a pair of side surfaces 2*c* and 2*d* facing away from each other, and a pair of side surfaces 2*e* and 2*f* facing away from each other. The four side surfaces 2*c*, 2*d*, 2*e*, and 2*f* are adjacent to the end surfaces 2*a* and 2*b*, respectively, and extend in a direction where the end surfaces 2*a* and 2*b* face away from each other so as to connect the end surfaces 2*a* and 2*b*. One of the four side surfaces 2*c*, 2*d*, 2*e*, and 2*f* is defined as a mounting surface that faces an electronic device to be protected.

In the present embodiment, a direction where the end surfaces 2*a* and 2*b* face away from each other is defined as a first direction D1, a direction where the side surfaces 2*e* and 2*f* face away from each other is defined as a second direction D2, and a direction where the side surfaces 2*c* and 2*d* face away from each other is defined as a third direction D3. The first direction D1 is a length direction of the element body 2, the second direction D2 is a width direction of the element body 2, and the third direction D3 is a height direction of the element body 2. The length of the element body 2 (the length of the element body 2 in the first direction D1) is, for example, 0.6 mm or more and 2.0 mm or less. The width of the element body 2 (the length of the element body 2 in the second direction D2) is, for example, 0.3 mm or more and 1.2 mm or less. The height of the element body 2 (the length of the element body 2 in the third direction D3) is, for example, 0.3 mm or more and 1.2 mm or less.

The element body 2 includes a plurality of insulator layers 10 laminated in the third direction D3. In the present embodiment, the element body 2 is formed by laminating the plurality of insulator layers 10. Each of the insulator layers 10 has a rectangular plate shape. Each of the insulator layers 10 is an insulator having an electrical insulation property and is formed of a sintered body of an insulator green sheet. In the actual element body 2, the insulator layers 10 are integrated to such an extent that the boundaries therebetween cannot be visually recognized.

The insulator layer 10 is made of a ceramic material, such as $Fe_2O_3$, NiO, CuO, ZnO, MgO, $SiO_2$, $TiO_2$, $MnCO_3$, $SrCO_3$, $CaCO_3$, $BaCO_3$, $Al_2O_3$, $ZrO_2$, and $B_2O_3$. The insulator layer 10 may be made of a single ceramic material or may be made of a mixture of two or more ceramic materials. The insulator layer 10 may contain glass. The insulator layer 10 may contain copper oxide (CuO, $Cu_2O$) to enable low-temperature firing.

The external electrodes 3 and 4 are provided on the outer surface of the element body 2. The external electrodes 3 and 4 are disposed on the element body 2 so as to face each other in the first direction D1. The external electrodes 3 and 4 are provided at both ends of the element body 2 in the first direction D1. The external electrodes 3 and 4 are spaced apart from each other in the first direction D1.

The external electrode 3 is provided on the end surface 2*a* and is connected to the internal electrode 5. The external electrode 3 is formed so as to cover the end surface 2*a* and partially cover the side surfaces 2*c*, 2*d*, 2*e*, and 2*f*. The external electrode 3 is provided on the entire end surface 2*a* and the end portions of the side surfaces 2*c*, 2*d*, 2*e*, and 2*f* on the end surface 2*a* side.

The external electrode 4 is provided on the end surface 2*b* is connected to the internal electrode 6. The external electrode 4 is formed so as to cover the end surface 2*b* and partially cover the side surfaces 2*c*, 2*d*, 2*e*, and 2*f*. The external electrode 4 is provided on the entire end surface 2*b* and the end portions of the side surfaces 2*c*, 2*d*, 2*e*, and 2*f* on the end surface 2*b* side.

The internal electrodes 5 and 6 are provided in the element body 2 so as to be spaced apart from each other. The internal electrodes 5 and 6 extend along the first direction D1. The internal electrodes 5 and 6 are arranged at interval in the second direction D2. The internal electrodes 5 and 6 face each other in the second direction D2 via a gap region Sg described later. The internal electrode 5 is disposed near the side surface 2*e*. The internal electrode 6 is disposed near the side surface 2*f*. The internal electrodes 5 and 6 are disposed at the same height position (that is, the same lamination position) in the third direction D3. The internal electrodes 5 and 6 are disposed on the same insulator layer 10. The internal electrodes 5 and 6 are provided substantially at the center in the laminating direction (third direction D3).

Each of the internal electrodes 5 and 6 has rectangular shape whose longitudinal direction is the first direction D1 in a plan view (that is, when viewed from the third direction D3). The internal electrodes 5 and 6 have, for example, the same shape. The lengths of the internal electrodes 5 and 6 (the lengths of the internal electrodes 5 and 6 in the first direction D1) are, for example, 0.5 mm or more and 1.6 mm or less. The widths of the internal electrodes 5 and 6 (the lengths of the internal electrodes 5 and 6 in the second direction D2) are, for example, 0.1 mm or more and 0.5 mm or less. The thicknesses of the internal electrodes 5 and 6 (the lengths of the internal electrodes 5 and 6 in the third direction D3) are, for example, 3 μm or more and 20 μm or less.

The internal electrode 5 includes a connection end (connection end surface) 5*a* connected to the external electrode 3 and a tip portion 5*b* located on the opposite side of the external electrode 3. The connection end 5*a* is exposed to the end surface 2*a*. The tip portion 5*b* is spaced apart from the end surface 2*b*. The tip portion 5*b* has a predetermined length in the extending direction (first direction D1) of the internal electrode 5. The tip portion 5*b* includes not only a tip (tip surface) of the internal electrode 5 but also a portion adjacent to the tip. The tip portion 5*b* is embedded in the element body 2 and is in contact with only the element body 2. The tip portion 5*b* is covered by the element body 2 so as not to be exposed from the element body 2. The tip portion 5*b* is in contact with the element body 2 not only in the first direction D1 but also in a direction intersecting the first direction D1. When viewed from the third direction D3, the tip portion 5*b* is spaced apart from the external electrode 4 and does not overlap the external electrode 4.

The internal electrode 5 includes a side edge (side surface) 5*c* facing the internal electrode 6, the side edge (side surface) 5*d* facing away from the side edge 5*c*, a first surface 5*e* in contact with the discharge auxiliary portion 7, and a second surface 5*e* facing away from the first surface 5*f*. The side edge 5*c* includes a portion facing a gap region Sg described later. The second surface 5*f* includes a portion facing a region other than the gap region Sg in the cavity portion S. The side edge 5*c* is adjacent to each of the first surface 5*e* and the second surface 5*f*. The internal electrode 5 is provided so as to be spaced apart from the end surface 2*b* and the side surfaces 2*c*, 2*d*, 2*e*, and 2*f*.

The internal electrode 6 includes a connection end (connection end surface) 6*a* connected to the external electrode 4 and a tip portion 6*b* located on the opposite side of the external electrode 4. The connection end 6*a* is exposed to the end surface 2*b*. The tip portion 6*b* is spaced apart from the end surface 2*a*. The tip portion 6*b* has a predetermined length in the extending direction (first direction D1) of the internal electrode 6. The tip portion 6*b* includes not only a tip (tip surface) of the internal electrode 6 but also a portion adjacent to the tip. The tip portion 6*b* is embedded in the element body 2 and is in contact with only the element body 2. The tip portion 6*b* is covered by the element body 2 so as not to be exposed from the element body 2. The tip portion 6*b* is in contact with the element body 2 not only in the first direction D1 but also in a direction intersecting the first direction D1. When viewed from the third direction D3, the tip portion 6*b* is spaced apart from the external electrode 3 and does not overlap the external electrode 3.

The internal electrode 6 includes a side edge (side surface) 6*c* facing the side edge 5*c* of the internal electrode 5, a side edge (side surface) 6*d* facing away from the side edge 6*d*, a first surface 6*e* in contact with the discharge auxiliary portion 7, and a second surface 6*e* facing away from the first surface 6*f*. The side edge 6*c* includes a portion facing the gap region Sg described later. The second surface 6*f* includes a portion facing a region other than the gap region Sg in the cavity portion S. The side edge 6*c* is adjacent to each of the first surface 6*e* and the second surface 6*f*. The internal electrode 6 is provided so as to be spaced apart from the end surface 2*a* and the side surfaces 2*c*, 2*d*, 2*e*, and 2*f*.

The external electrodes 3 and 4 and the internal electrodes 5 and 6 are made of a conductive material containing, for example, Ag, Pd, Au, Pt, Cu, Ni, Al, Mo, or W. The external electrodes 3 and 4 and the internal electrodes 5 and 6 may be made of, for example, an Ag/Pd alloy, an Ag/Cu alloy, an Ag/Au alloy, or an Ag/Pt alloy. The external electrodes 3 and 4 and the internal electrodes 5 and 6 may be made of the same material or different materials.

The external electrodes 3 and 4 are formed by, for example, applying a conductive paste containing the conductive material to the outer surface of the element body 2 and then firing the conductive paste. The external electrodes 3 and 4 may include plating layers. The internal electrodes 5 and 6 are formed by, for example, applying a conductive paste containing the described conductive material onto an insulator green sheet by printing and then firing the conductive paste together with the insulator green sheet.

The discharge auxiliary portion 7 is provided in the element body 2. The discharge auxiliary portion 7 has a rectangular shape whose longitudinal direction is the first direction D1 in a plan view (that is, when viewed from the third direction D3). The length of the discharge auxiliary portion 7 (the length of the discharge auxiliary portion 7 in the first direction D1) is, for example, 0.4 mm or more and 1.5 mm or less. The width of the discharge auxiliary portion 7 (the length of the discharge auxiliary portion 7 in the second direction D2) is, for example, 0.15 mm or more and 0.95 mm or less. The thickness of the discharge auxiliary portion 7 (the length of the discharge auxiliary portion 7 in the third direction D3) is, for example, 3 μm or more and 20 μm or less.

The discharge auxiliary portion 7 is provided apart from the outer surface of the element body 2 so as not to be exposed from the element body 2. The discharge auxiliary portion 7 is in contact with the internal electrodes 5 and 6 and connects the internal electrodes 5 and 6 to each other. One end of the discharge auxiliary portion 7 in the second direction D2 coincides with one end of the internal electrode 5 in the second direction D2. The other end of the discharge auxiliary portion 7 in the second direction D2 coincides with the other end of the internal electrode 6 in the second direction D2. The discharge auxiliary portion 7 is exposed from the internal electrodes 5 and 6 and faces the gap region Sg.

The discharge auxiliary portion 7 includes a first portion 7*a*, a second portion 7*b*, and a third portion 7*c*. The first portion 7*a* is covered with the internal electrode 5 and is in contact with the first surface 5*e*. The second portion 7*b* is covered with the internal electrode 6 and is in contact with the first surface 6*e*. The third portion 7*c* extends in the second direction D2 and connects the first portion 7*a* and the second portion 7*b* to each other. The third portion 7*c* is exposed from the internal electrodes 5 and 6 and has a region facing the gap region Sg.

The discharge auxiliary portion 7 includes an insulator and metal particles. The insulator is made of, for example, a ceramic material. The ceramic material may include, for example, $Fe_2O_3$, NiO, CuO, ZnO, MgO, $SiO_2$, $TiO_2$, $MnCO_3$, $SrCO_3$, $CaCO_3$, $BaCO_3$, $Al_2O_3$, $ZrO_2$, or $B_2O_3$. The discharge auxiliary portion 7 may contain only one of these ceramic materials, or may contain a mixture of two or more of these ceramic materials. The metal particles are made of, for example, Ag, Pd, Au, Pt, an Ag/Pd alloy, an Ag/Cu alloy, an Ag/Au alloy, or an Ag/Pt alloy. The discharge auxiliary portion 7 may include semiconductor particles such as $RuO_2$. The discharge auxiliary portion 7 may include glass.

The discharge auxiliary portion 7 is formed by, for example, applying a slurry containing the ceramic material, metal particles, and the like onto the insulator green sheet by printing, and then firing the slurry together with the insulator green sheet.

The cavity portion S is provided in the element body 2. The cavity portion S includes the gap region Sg located between the internal electrodes 5 and 6 in the second direction D2. The width of the gap region Sg (the length of the gap region Sg in the second direction D2), that is, the interval between the internal electrodes 5 and 6 are, for example, 10 μm or more and 70 μm or less. The cavity portion S is provided to be spaced apart from the outer surface of the element body 2. The surfaces defining the cavity portion S include the side edge 5*c* and the second surface 5*f* of the internal electrode 5, the side edge 6*c* and the second surface 6*f* of the internal electrode 6, and surface exposed from the internal electrodes 5 and 6 in the third portion 7*c* of the discharge auxiliary portion 7.

When viewed from the third direction D3, the cavity portion S is located inside the outer edge of the discharge auxiliary portion 7. The discharge auxiliary portion 7 is longer than the cavity portion S in each of the first direction D1 and the second direction D2. The cavity portion S is formed by, for example, applying an organic lacquer containing an organic solvent and an organic binder onto the insulator green sheet by printing, and then firing the organic lacquer together with the insulator green sheet to burn out the organic lacquer.

As described above, in the transient voltage protection device 1, the gap region Sg of the cavity portion S is located between the internal electrodes 5 and 6 facing each other.

Therefore, discharge can be easily generated between the internal electrodes 5 and 6. The tip portions 5*b* and 6*b* of the internal electrodes 5 and 6 are embedded in the element body 2 and are in contact with only the element body 2. For this reason, as a result of suppressing discharge in the tip portions 5*b* and 6*b*, deterioration of the tip portions 5*b* and 6*b* is suppressed. Therefore, the transient voltage protection device 1 can achieve both high ESD resistance and long life. In the transient voltage protection device 1, since the side edges 5*c* and 6*c* extending along the longitudinal direction are opposed to each other, the portion to be discharged can be lengthened. Therefore, high ESD resistance can be further achieved.

The discharge auxiliary portion 7 is in contact with the internal electrodes 5 and 6 and connects the internal electrodes 5 and 6 to each other. Therefore, discharge can be reliably generated between the internal electrodes 5 and 6. As a result, high ESD resistance can be reliably achieved.

Since the discharge auxiliary portion 7 includes the third portion 7*c* which is exposed from the internal electrodes 5 and 6 and faces the gap region Sg, discharge can be more reliably generated between the internal electrodes 5 and 6. Therefore, high ESD resistance can be more reliably achieved.

In the internal electrodes 5 and 6, since the side edges 5*c* and 6*c* facing the gap region Sg and the first surfaces 5*e* and 6*e* in contact with the discharge auxiliary portion 7 are adjacent to each other, the discharge can be more reliably generated between the internal electrodes 5 and 6. Therefore, high ESD resistance can be more reliably achieved.

Since the second surfaces 5*f* and 6*f* of the internal electrodes 5 and 6 face the cavity portion S, discharge is likely to occur also in the second surfaces 5*f* and 6*f*. Therefore, discharge can be more easily generated between the internal electrodes 5 and 6. As a result, high ESD resistance can be more reliably achieved.

The external electrodes 3 and 4 are disposed on the element body 2 so as to face each other in the first direction D1. That is, since the external electrodes 3 and 4 are disposed at both end portions of the element body 2 in the first direction D1, the external electrodes 3 and 4 can be spaced apart from each other. Therefore, it is possible to suppress the occurrence of short circuit between the external electrodes 3 and 4.

The present invention is not necessarily limited to the above-described embodiment, and various modifications can be made without departing from the scope of the present invention.

Figure 5:
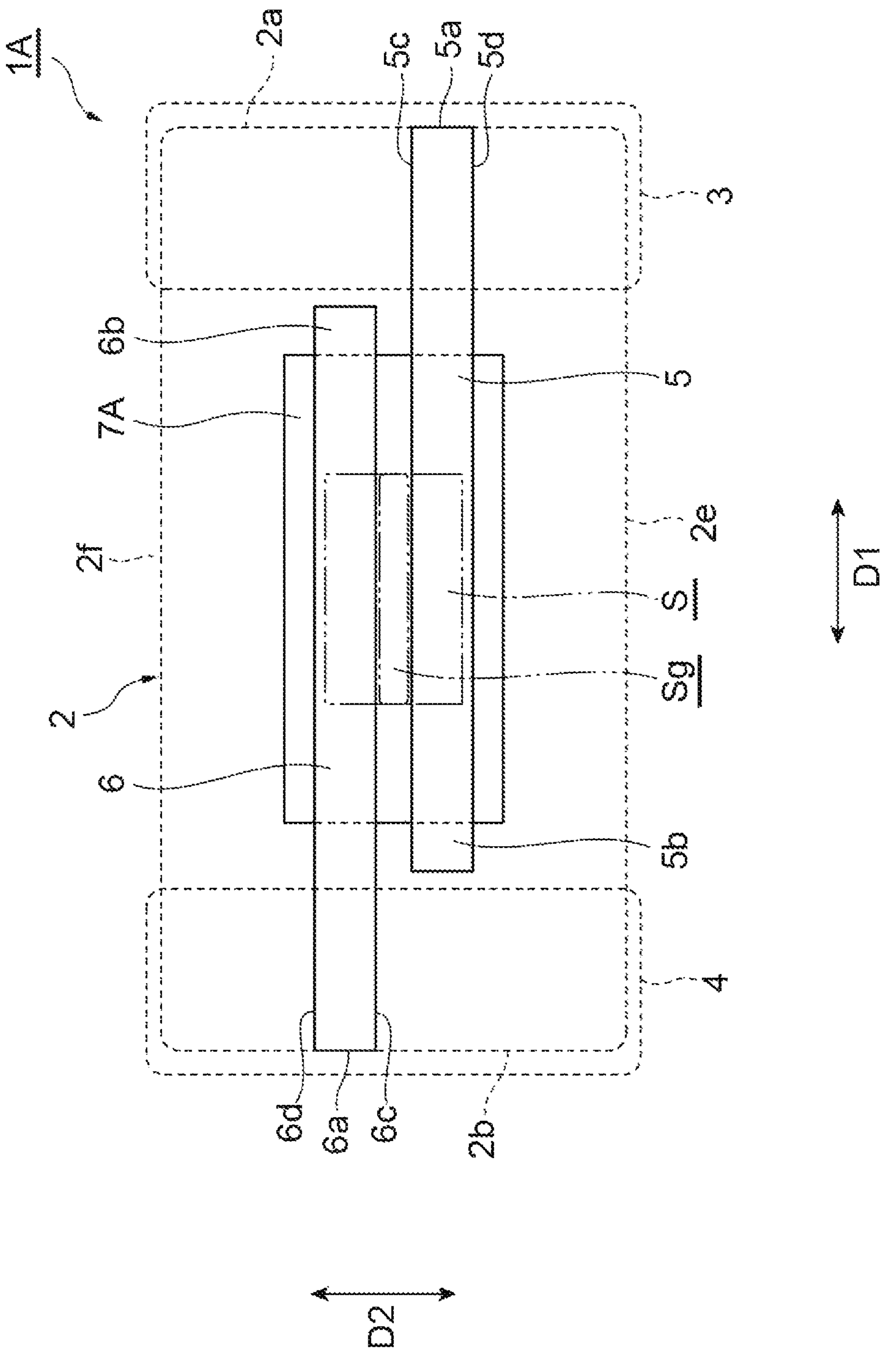
FIG. 5 is a perspective view of the transient voltage protection device according to a first modification viewed from the laminating direction.

As shown in FIG. 5, the transient voltage protection device 1A according to the first modification is different from the transient voltage protection device 1 (see FIG. 3) in that the discharge auxiliary portion 7A extends to the outside of the internal electrodes 5 and 6 in the second direction D2 when viewed from the third direction D3. That is, in addition to the first portion 7*a*, the second portion 7*b*, and the third portion 7*c*, the discharge auxiliary portion 7*c* includes a portion extending outside the first portion 7*a* along the second direction D2, and a portion extending outside the second portion 7*b* along the second direction D2. The discharge auxiliary portion 7A is longer than the discharge auxiliary portion 7 (see FIG. 3) in the second direction D2.

Also in the transient voltage protection device 1A, since the gap region Sg is located between the internal electrodes 5 and 6 and the tip portions 5*b* and 6*b* of the internal electrodes 5 and 6 are in contact with only the element body 2, both high ESD resistance and long life can be achieved.

In the transient voltage protection device 1A, when viewed from the third direction D3, the discharge auxiliary portion 7A extends to the outside of the internal electrodes 5 and 6 in the second direction D2. However, the discharge auxiliary portion 7A may be located inside the internal electrodes 5 and 6 in the second direction D2. That is, when viewed from the third direction D3, one end of the discharge auxiliary portion 7 in the second direction D2 may be located inward of one end of the internal electrode 5 in the second direction D2. The other end of the discharge auxiliary portion 7 in the second direction D2 may be located inward of the other end of the internal electrode 6 in the second direction D2.

Figure 6:
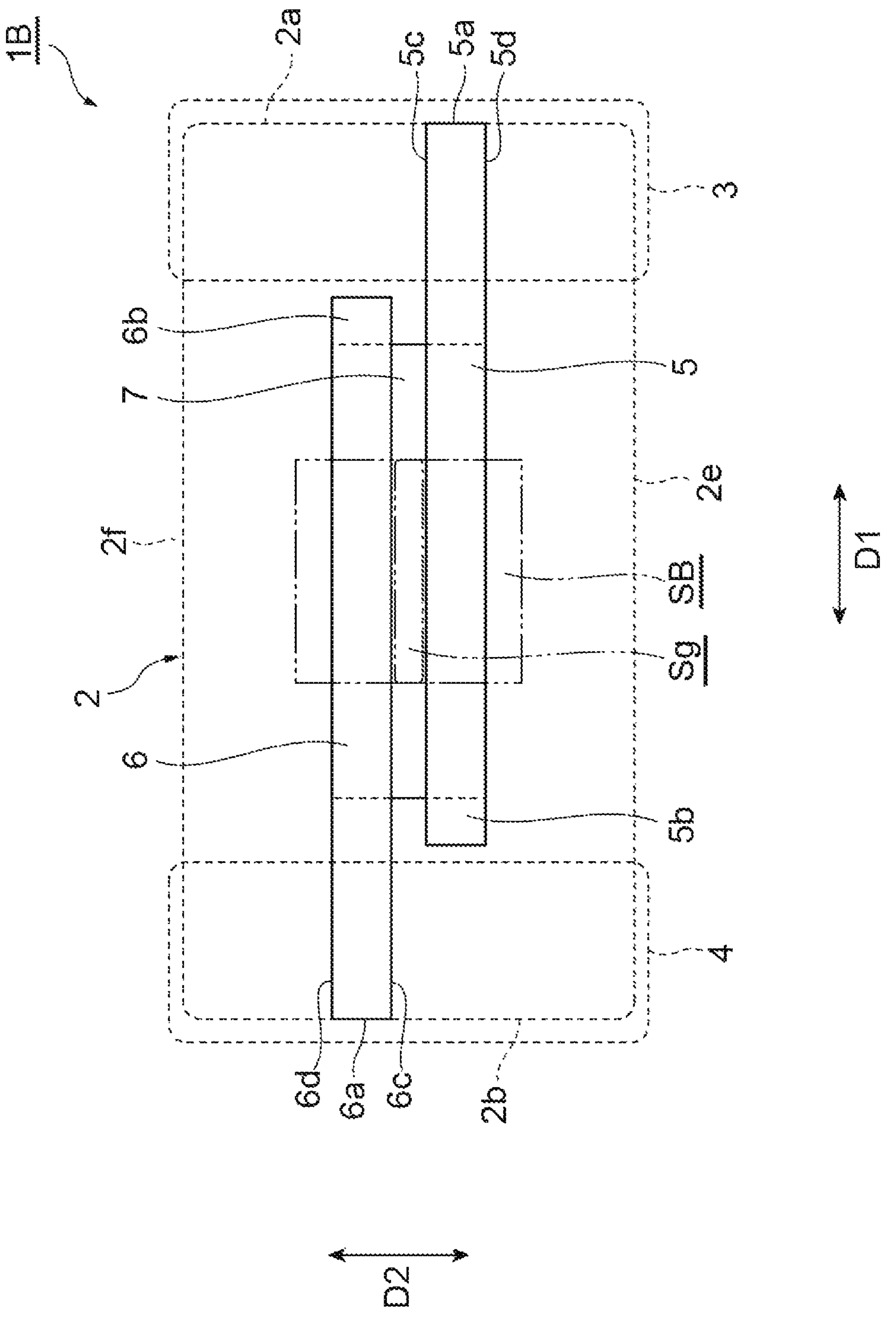
FIG. 6 is a perspective view of a transient voltage protection device according to a second modification viewed from the laminating direction.
Figure 7:
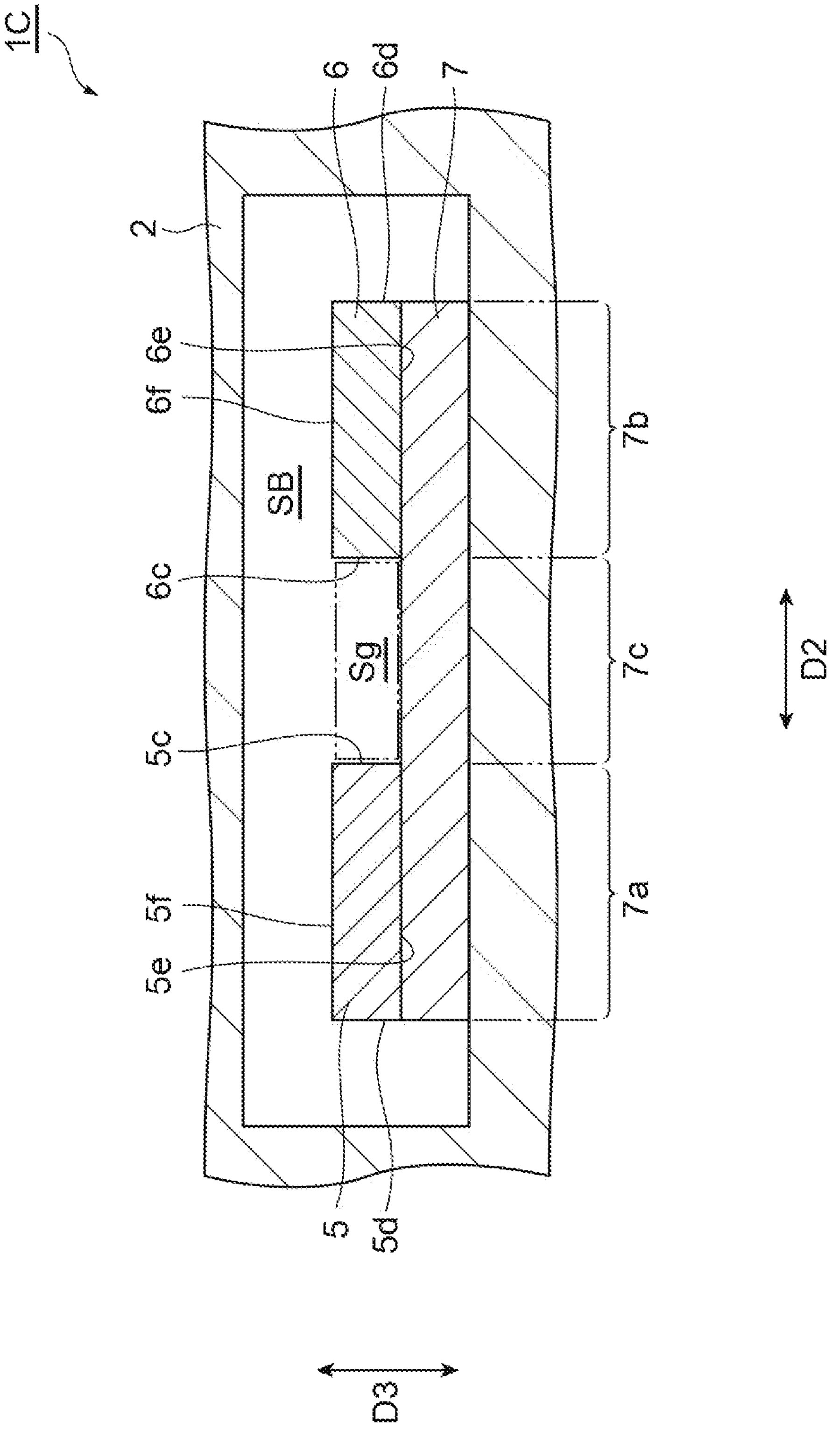
FIG. 7 is a cross-sectional view of the transient voltage protection device of FIG. 6.

As shown in FIGS. 6 and 7, the transient voltage protection device 1B according to the second modification is different from the transient voltage protection device 1 (see FIG. 3) in that the cavity portion SB extends to the outside of the internal electrodes 5 and 6 and the discharge auxiliary portion 7 in the second direction D2 when viewed from the third direction D3. The cavity portion SB is longer than the cavity portion S (see FIG. 3) in the second direction D2. Also in the transient voltage protection device 1B, since the gap region Sg is located between the internal electrodes 5 and 6 and the tip portions 5*b* and 6*b* of the internal electrodes 5 and 6 are in contact with only the element body 2, both high ESD resistance and long life can be achieved.

In the transient voltage protection device 1B, when viewed from the third direction D3, the cavity portion SB may extend to the outside of the discharge auxiliary portion 7 in the first direction D1, not in the second direction D2. When viewed in the third direction D3, the cavity portion SB may extend to the outside of the discharge auxiliary portion 7 in each of the first direction D1 and the second direction D2.

In the transient voltage protection devices 1, 1A, and 1B, at least one of the tip portions 5*b* and 6*b* may be in contact with only the element body 2. In the transient voltage protection devices 1, 1A, and 1B, at least the side edges 5*c* and 6*c* may include portions facing the gap region Sg, and the internal electrodes 5 and 6 may not include portions facing regions other than the gap region Sg in the cavity portions S and SB. The cavity portions S and SB may not include the region other than the gap region Sg. At least one of the internal electrodes 5 and 6 may include the portion facing the region other than the gap region Sg in the cavity portions S and SB.

In the transient voltage protection devices 1, 1A, and 1B, the internal electrodes 5 and 6 have the same shape, but may have different shapes. In the transient voltage protection devices 1, 1A, and 1B, the internal electrodes 5 and 6 extend entirely along the first direction D1, but may include, for example, a portion that is curved or bent and does not extend along the first direction D1.

In the transient voltage protection devices 1, 1A, and 1B, the internal electrodes 5 and 6, the discharge auxiliary portions 7 and 7A, and the cavity portions S and SB are provided substantially at the center in the laminating direction (the third direction D3), but may be provided closer to the side surface 2*c* or the side surface 2*d* than the center in the laminating direction.

The above-described embodiments and modifications may be appropriately combined. For example, the cavity portion SB may be provided instead of the cavity portion S in the transient voltage protection device 1A. In this case, when viewed from the third direction D3, both ends of the discharge auxiliary portion 7A in the second direction D2 may coincide with both ends of the cavity portion SB in the second direction D2, may be located outside both ends of the cavity portion SB in the second direction D2, or may be located inside both ends of the cavity portion SB in the second direction D2.

What is claimed is:

1. A transient voltage protection device comprising:
an element body;
a cavity portion provided in the element body;
a pair of internal electrodes disposed in the element body; and
a pair of external electrodes connected to the pair of internal electrodes,
wherein the pair of internal electrodes extend along a first direction and face each other in a second direction intersecting the first direction,
the cavity portion includes a gap region located between the pair of internal electrodes in the second direction, and
a tip portion on a distal end of at least one of the pair of internal electrodes is in contact with only the element body, and
the tip portion is not in contact with the gap region.

2. The transient voltage protection device according to claim 1, wherein
a tip portion on a distal end of each of the pair of internal electrodes is in contact with only the element body.

3. The transient voltage protection device according to claim 1, wherein
at least one of the pair of internal electrodes includes a portion facing a region other than the gap region in the cavity portion.

4. The transient voltage protection device according to claim 1, further comprising a discharge auxiliary portion disposed in the element body,
wherein the discharge auxiliary portion is in contact with the pair of internal electrodes and connects the pair of internal electrodes to each other.

5. The transient voltage protection device according to claim 4,
wherein the discharge auxiliary portion faces the gap region.

6. The transient voltage protection device according to claim 4,
wherein each of the pair of internal electrodes includes:
a side edge facing the gap region; and
a first surface adjacent to the side edge and being in contact with the discharge auxiliary portion.

7. The transient voltage protection device according to claim 6, wherein
each of the pair of internal electrodes further includes a second surface that is adjacent to the side edge and faces away from the first surface, and
the second surface faces the cavity portion.

8. The transient voltage protection device according to claim 1, wherein
the pair of external electrodes is disposed on the element body so as to face each other in the first direction.

9. The transient voltage protection device according to claim 1, wherein
the element body includes a plurality of insulator layers that is laminated.

10. The transient voltage protection device according to claim 1, wherein
the pair of external electrodes is provided at both ends of the element body in the first direction.

11. The transient voltage protection device according to claim 1, wherein
each of the pair of internal electrodes has rectangular shape whose longitudinal direction is the first direction in a plan view.

12. The transient voltage protection device according to claim 1, wherein
the cavity portion is spaced apart from an outer surface of the element body.

13. The transient voltage protection device according to claim 4, wherein
the discharge auxiliary portion is spaced apart from an outer surface of the element body.

14. The transient voltage protection device according to claim 4, wherein
the discharge auxiliary portion includes an insulator and metal particles.

15. The transient voltage protection device according to claim 4, wherein
the cavity portion is located inside an outer edge of the discharge auxiliary portion in a plan view.

* * * * *